(12) United States Patent
You et al.

(10) Patent No.: US 10,316,862 B2
(45) Date of Patent: Jun. 11, 2019

(54) FAN AND METHOD OF COOLING A MOTOR

(71) Applicants: Regal Beloit Corporation Management (Shanghai) Co., Ltd., Shanghai (CN); Marathon Electric India Pvt. Ltd., Hyderabad (IN); Regal Beloit (Wuxi) Co., Ltd., Jiangsu (CN)

(72) Inventors: Shawn You, Shanghai (CN); Umesh M. Sawarkar, Telengana (IN); ShunRui Wu, Jiangsu (CN)

(73) Assignees: Regal Beloit Corporation Management (Shanghai) Co., Ltd., Shanghai (CN); Marathon Electric India PVT. LTD., Hyderabad (IN); Regal Beloit Corporation (Wuxi) Co., Ltd., Jiangsu (CN)

( * ) Notice: Subject to any disclaimer, the term of this patent is extended or adjusted under 35 U.S.C. 154(b) by 273 days.

(21) Appl. No.: 14/879,511

(22) Filed: Oct. 9, 2015

(65) Prior Publication Data

US 2016/0102676 A1    Apr. 14, 2016

(30) Foreign Application Priority Data

Oct. 11, 2014    (CN) .......................... 2014 1 0642765

(51) Int. Cl.
*F04D 19/00* (2006.01)
*F04D 29/28* (2006.01)
(Continued)

(52) U.S. Cl.
CPC ....... *F04D 29/5806* (2013.01); *F04D 17/162* (2013.01); *F04D 19/002* (2013.01);
(Continued)

(58) Field of Classification Search
CPC .... F04D 17/162; F04D 19/002; F04D 29/281; F04D 29/30; F04D 29/325; F04D 29/384; F04D 29/522; F04D 25/064; F04D 29/18; F04D 29/183; F04D 29/2216; H02K 5/225; H02K 7/14; H02K 9/14; F05B 2240/121; F05B 2240/30; F05B 2240/33;
(Continued)

(56) References Cited

U.S. PATENT DOCUMENTS

| 5,695,318 A | * | 12/1997 | Harmsen | ................. F04D 17/06 415/218.1 |
| 5,906,179 A | | 5/1999 | Capdevila | |

(Continued)

FOREIGN PATENT DOCUMENTS

DE    19829070 A1    5/2000

OTHER PUBLICATIONS

Partial European Search Report for Application No. 15189108.2; dated Feb. 19, 2016; 5 pages.

*Primary Examiner* — Carlos A Rivera
*Assistant Examiner* — Justin A Pruitt
(74) *Attorney, Agent, or Firm* — Armstrong Teasdale LLP

(57) ABSTRACT

A fan comprises a hub and at least one blade coupled to the hub. The blade comprises an inlet portion and an outlet portion. The inlet portion is defined by a longitudinal axis, an inlet edge, and a portion of a distal edge. The outlet portion is defined by the longitudinal axis, an outlet edge, and another portion of the distal edge.

16 Claims, 8 Drawing Sheets

(51) Int. Cl.
- *F04D 29/30* (2006.01)
- *F04D 29/32* (2006.01)
- *F04D 29/38* (2006.01)
- *F04D 29/58* (2006.01)
- *F04D 17/16* (2006.01)
- *F04D 29/52* (2006.01)
- *H02K 5/22* (2006.01)
- *H02K 7/14* (2006.01)
- *H02K 9/14* (2006.01)

(52) U.S. Cl.
CPC ........... *F04D 29/281* (2013.01); *F04D 29/30* (2013.01); *F04D 29/325* (2013.01); *F04D 29/38* (2013.01); *F04D 29/384* (2013.01); *F04D 29/522* (2013.01); *H02K 5/225* (2013.01); *H02K 7/14* (2013.01); *H02K 9/14* (2013.01)

(58) Field of Classification Search
CPC .......... F05B 2250/131; F05B 2250/711; F05B 2250/712; F05B 2250/713; F05B 2250/73
See application file for complete search history.

(56) References Cited

U.S. PATENT DOCUMENTS

| | | | |
|---|---|---|---|
| 5,957,661 A | 9/1999 | Hunt et al. | |
| 2002/0141888 A1* | 10/2002 | Bostwick | F04D 17/105 417/366 |
| 2005/0134126 A1 | 6/2005 | Ibach | |
| 2012/0128501 A1 | 5/2012 | Hoofard et al. | |
| 2014/0062232 A1* | 3/2014 | Cocks | H02K 9/14 310/59 |

* cited by examiner

FAN AND METHOD OF COOLING A MOTOR

CROSS REFERENCE TO RELATED APPLICATION

This application claims priority to Chinese Application No. 201410642765.5 filed Oct. 11, 2014, which is hereby incorporated by reference in its entirety.

BACKGROUND

The field of the disclosure relates generally to cooling motors and, more specifically, to using axial fans to cool electric motors.

Some known axial fans include an impeller having a plurality of blades positioned around a hub. A motor rotates the impeller about an axis and the impeller directs air in a direction substantially parallel to the axis. As the impeller directs air, the airflow has different air velocities and, thus, air pressures along the blades of the impeller. The differences in air pressure generate inefficient flow structures, which equate to energy losses. Typically, fans generate inefficient flow structures near the hub, underneath the blades, and where airflow enters the fan.

Some enclosed electric motors utilize axial fans for cooling. The electric motors generally include a stator and a rotor that are fully enclosed within a housing. The axial fan is connected at an end of a rotor shaft to boost air circulation over the housing and to increase heat dissipation from the rotor and stator to the ambient environment. Some of these fan-cooled electric motors include a fan cowl to facilitate directing cooling air over the outer surface of the electric motor housing. These systems for cooling enclosed motors create points of high pressure and, thus, generate inefficiencies and noise.

BRIEF DESCRIPTION

In one aspect, an axial fan comprises a hub defining a center of the axial fan and a guide surrounding the hub. The guide defines at least one opening that facilitates airflow on an outlet side of the axial fan. The axial fan further comprises at least one blade coupled to the hub and extending radially outward from the hub. The guide bisects the at least one blade along a blade longitudinal axis. The blade longitudinal axis defines an inlet portion and an outlet portion of the at least one blade.

In another aspect, a fan comprises a hub defining a center of the fan and a blade coupled to the hub. The blade extends radially outward from the hub and has a longitudinal axis. The blade comprises an inlet distal tip spaced a first radial distance from a first hub connection point and an outlet distal tip spaced a second radial distance from the first hub connection point. A distal edge extends between the inlet distal tip and the outlet distal tip. An inlet edge extends between the inlet distal tip and the first hub connection point. An outlet edge extends between the outlet distal tip and a second hub connection point. The blade longitudinal axis, the inlet edge and a first portion of the distal edge define an inlet portion of the blade. The longitudinal axis, the outlet edge, and a second portion of the distal edge define an outlet portion of the blade.

In another aspect, a method of cooling an enclosed motor uses a fan coupled to the motor. The method includes providing the fan comprising an impeller with a plurality of blades and a guide coupled to the plurality of blades. A first blade of the plurality of blades has an inlet portion and a second blade of the plurality of blades has an outlet portion. The method further comprises rotating the impeller to draw air into the fan on an inlet side such that air contacts the inlet portion of the first blade. Air is directed through an opening in the guide towards an outlet side of the fan such that air contacts the outlet portion of the second blade.

DETAILED DESCRIPTION

Described below are a fan and a method of using a fan for cooling a motor efficiently and quietly. The fan includes a plurality of blades connected to a central hub and a guide surrounding the hub and bisecting the blades. The fan utilizes a unique blade shape, similar to the shape of a shark tail, to optimally direct air. In conjunction with this double-sided blade shape, the guide has openings to facilitate airflow across both inlet and outlet portions of the blades. Moreover, the openings facilitate a sufficient airflow to an outlet side of the fan to alleviate high pressure buildup. Therefore, the fan generates minimal noise while efficiently directing air towards a motor for cooling.

Figure 1:
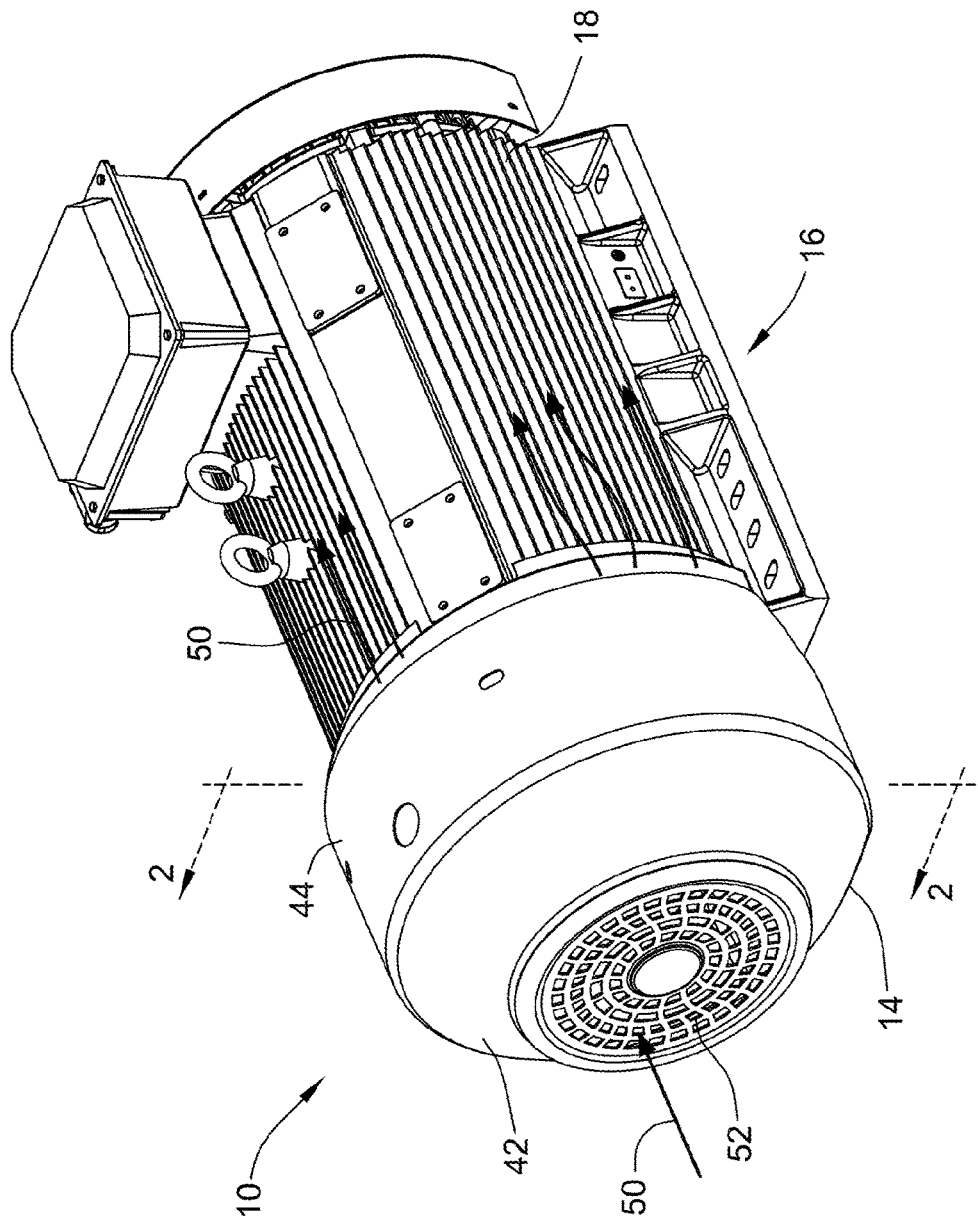
FIG. 1 is a schematic perspective of an exemplary electric motor cooled by an axial fan and including an axial fan cowl.
Figure 2:
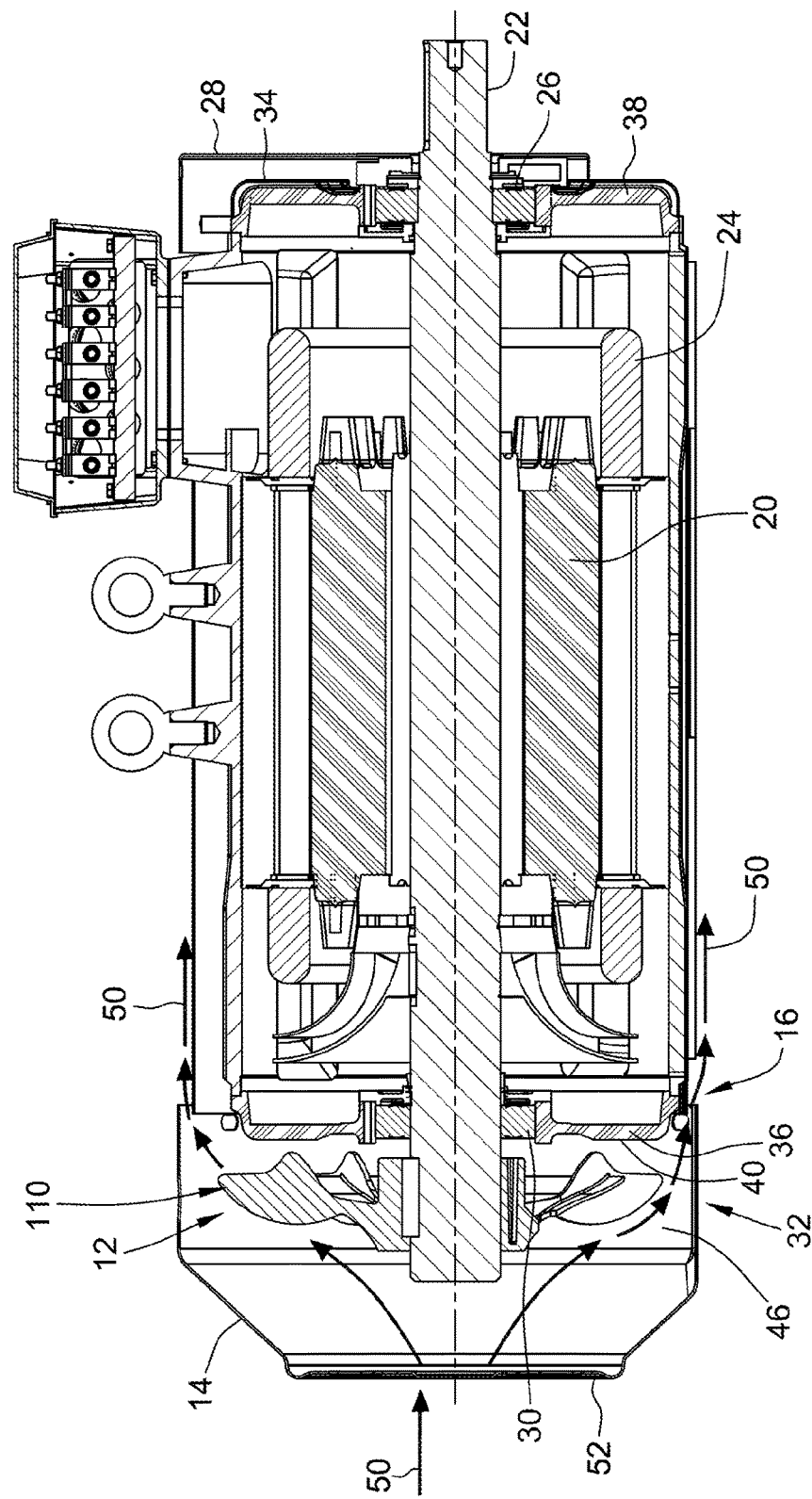
FIG. 2 is a cross-sectional view of the electric motor of FIG. 1 taken along line 2-2.

FIG. 1 is a schematic perspective of an exemplary electric motor 10, and FIG. 2 is a cross-sectional view of electric motor 10 taken along line 2-2. Motor 10 is cooled by an axial fan 12 and includes an axial fan cowl 14. In the exemplary embodiment, motor 10 is a totally enclosed motor. A cylindrical housing 16 encloses motor 10 to inhibit the intrusion of dirt and/or other harmful contaminants into motor 10. Housing 16 includes a plurality of cooling fins 18 substantially covering and extending outward from housing 16 along a direction substantially parallel to a central longitudinal axis of motor 10. Cooling fins 18 are thermally coupled to heat-generating components of motor 10 to dissipate generated heat.

Motor 10 includes a rotor 20 coupled to a rotor shaft 22 that extends through a central longitudinal axis of motor 10 within housing 16. Rotor 20 is surrounded by a stator 24 that is coupled to housing 16. Rotor shaft 22 is supported by a bearing assembly 26 located at a drive end 28 of motor 10 and a bearing assembly 30 located at an end 32 of motor 10 opposite drive end 28. Bearing assemblies 26 and 30 are generally supported by circular end brackets 34 and 36, respectively. In the exemplary embodiment, circular end brackets 34 and 36 include cooling fins 38 and 40, respectively, similar to cooling fins 18.

Cowl 14 is securely coupled to end 32 of motor 10 and surrounds axial fan 12. Cowl 14 generally includes an end wall 42, and a sidewall 44 that define a chamber 46. End wall 42 and sidewall 44 are shaped to fit over axial fan 12. The shape of cowl 14 provides for a compact assembly and optimizes the material used to produce cowl 14. Additionally, the shape of cowl 14 facilitates guiding airflow 50 towards motor 10. In operation, axial fan 12 draws airflow 50 into cowl 14 through an inlet 52 and redirects airflow 50 in a generally axial direction. Cowl 14 deflects some of airflow 50 towards the channels formed by cooling fins 18 on housing 16 of motor 10. In alternative embodiments, cowl 14 is excluded because axial fan 12 directs a sufficient amount of airflow 50 towards cooling fins 18 to cool motor 10 without cowl 14.

Figure 3:
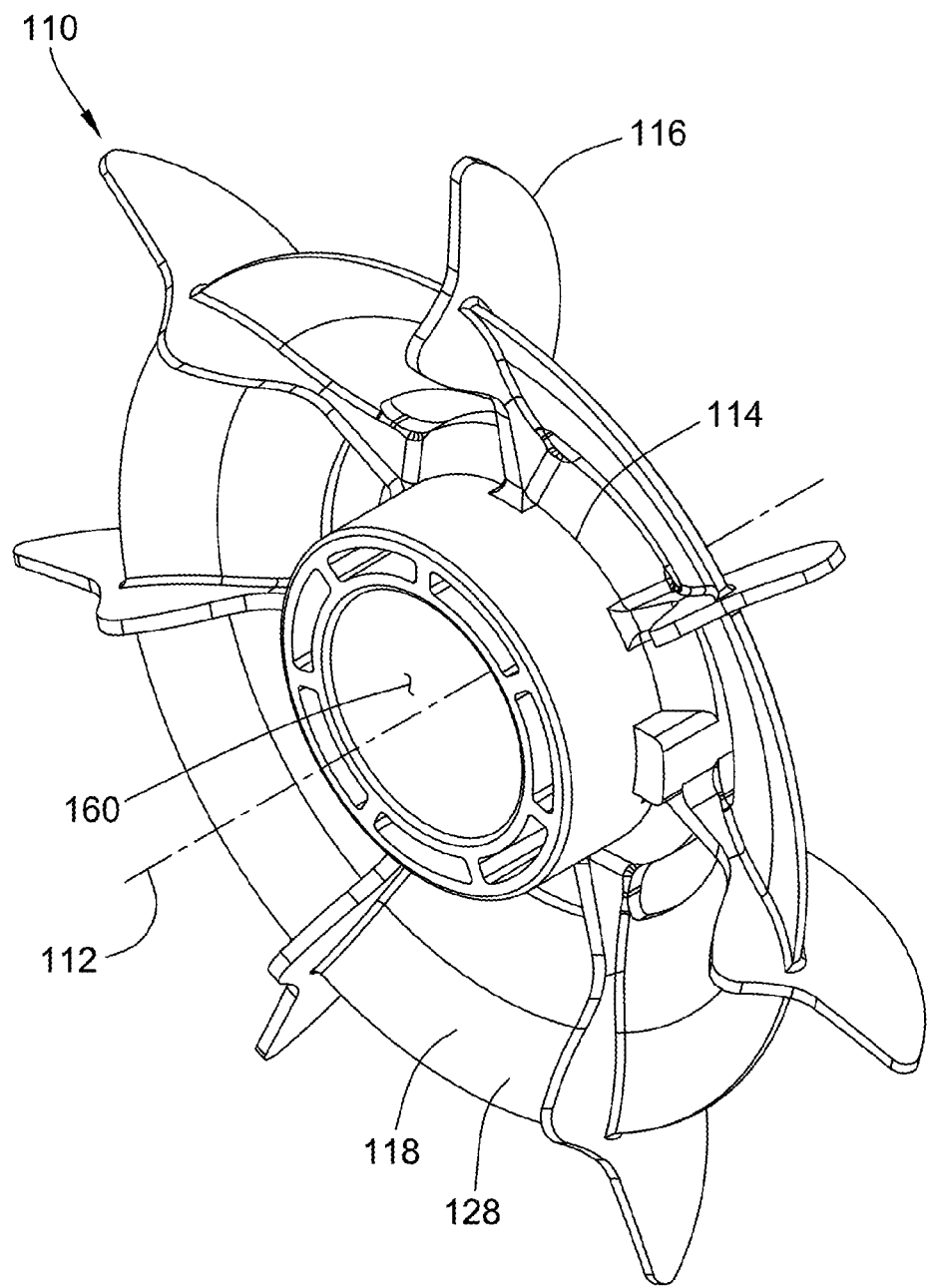
FIG. 3 is a schematic perspective of an exemplary axial fan impeller.
Figure 4:
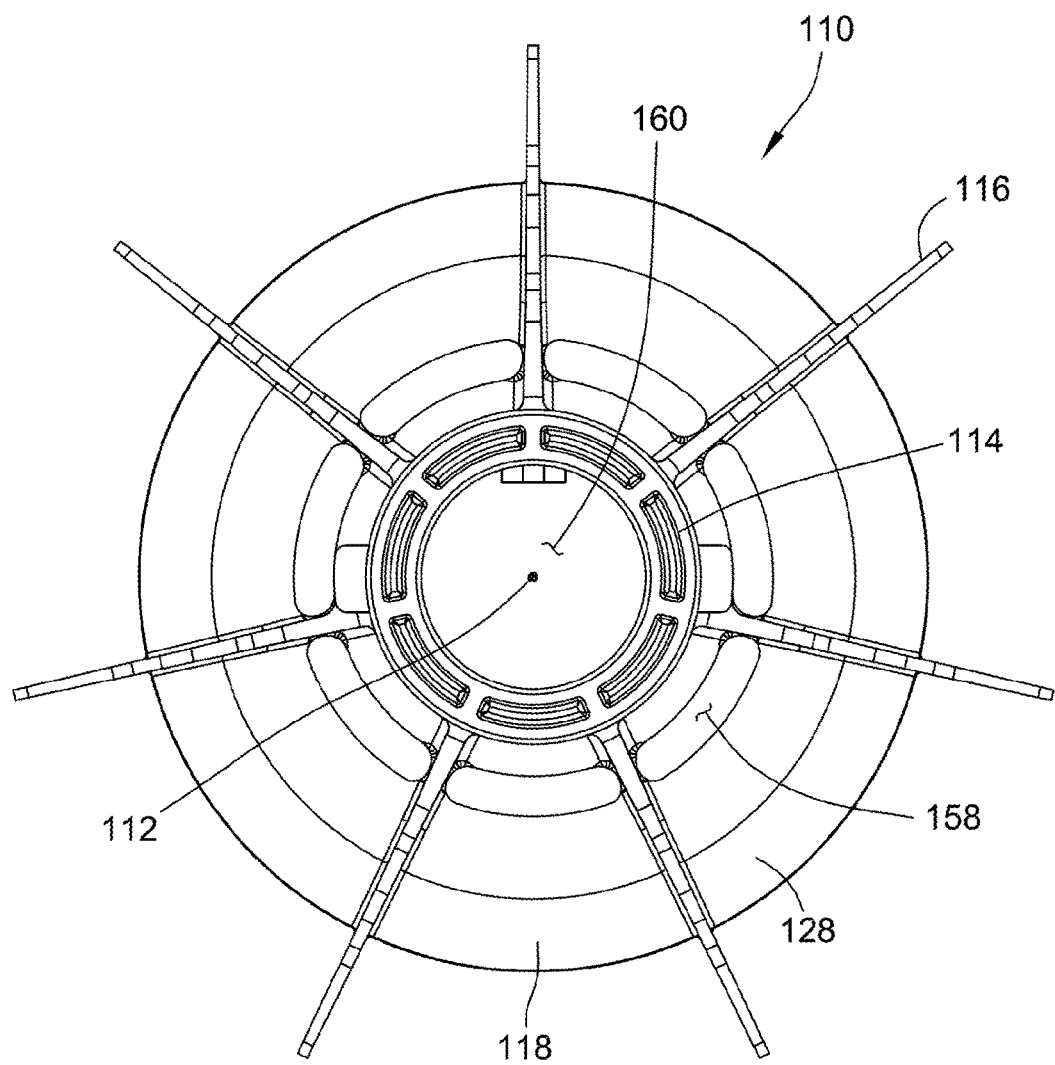
FIG. 4 is a front view of the axial fan impeller of FIG. 3.
Figure 5:
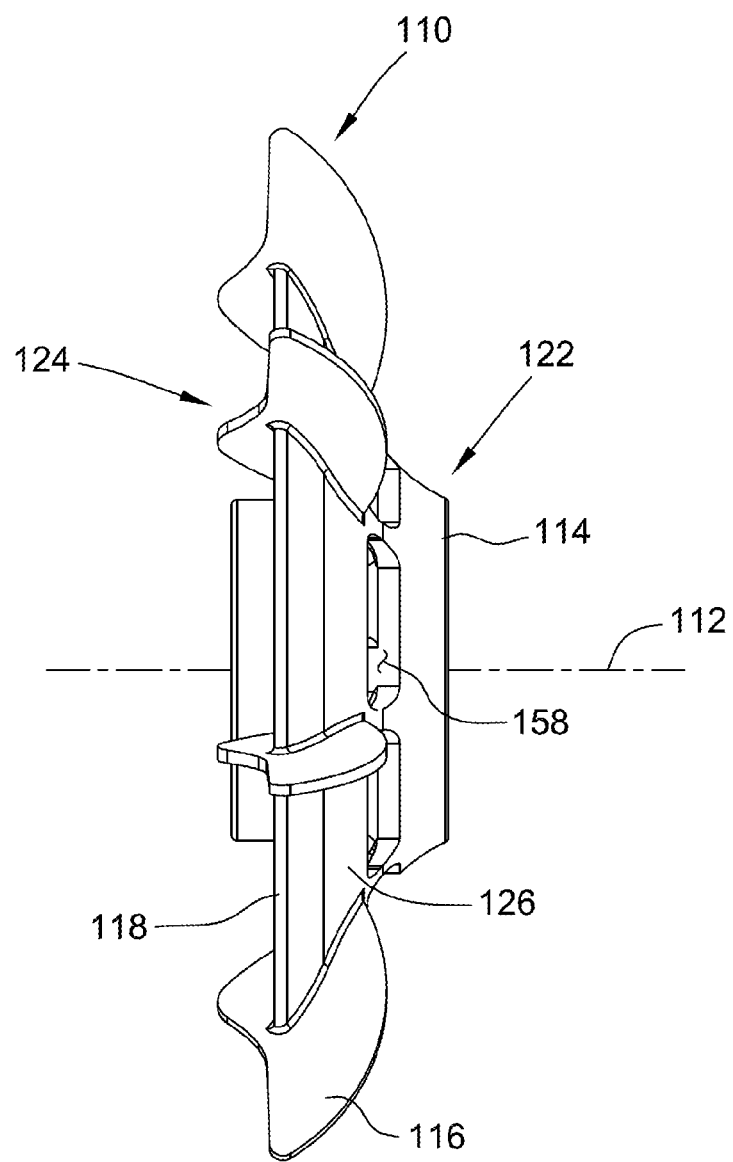
FIG. 5 is a side view of the axial fan impeller of FIG. 3.
Figure 6:
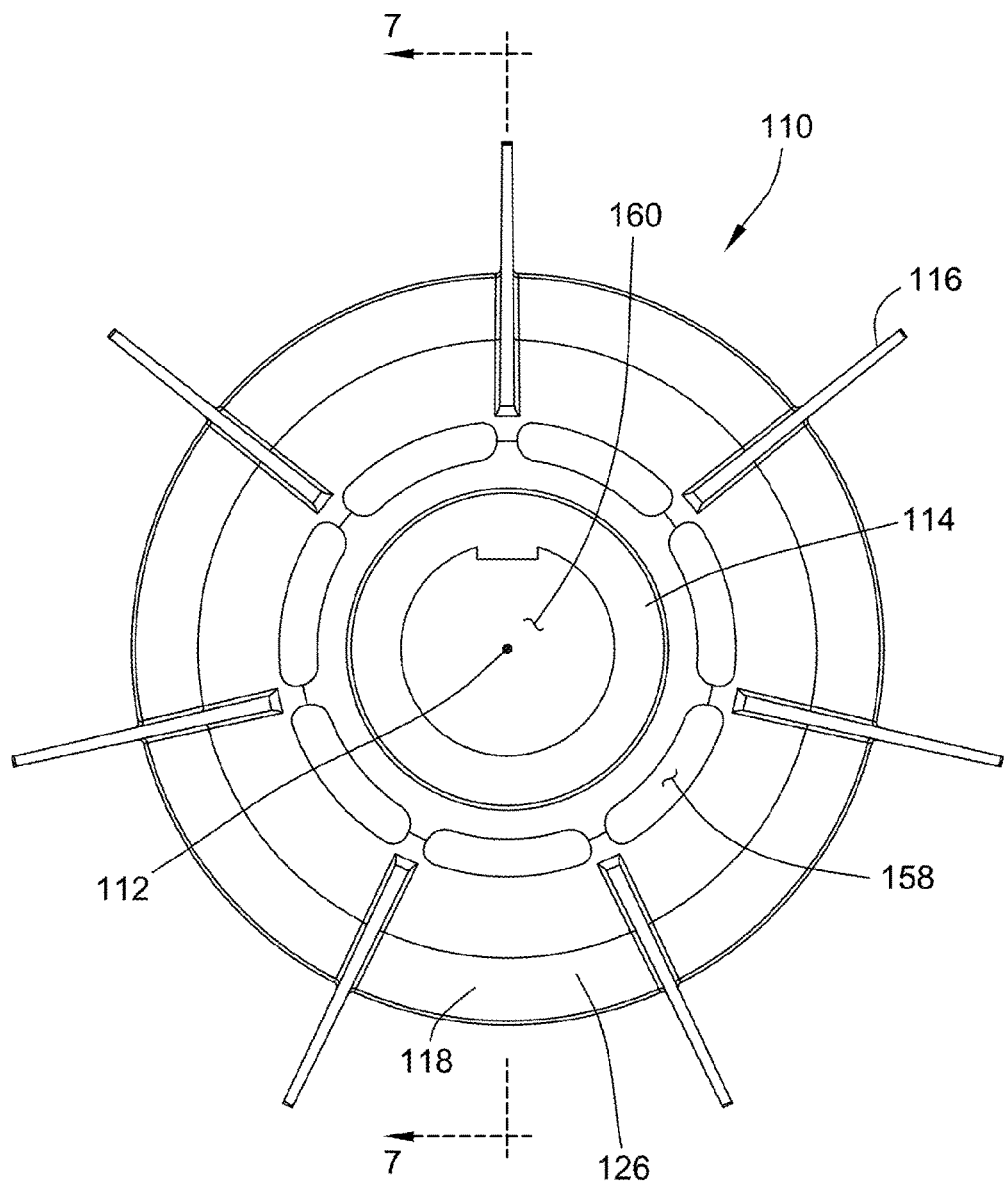
FIG. 6 is a rear view of the axial fan impeller of FIG. 3.
Figure 7:
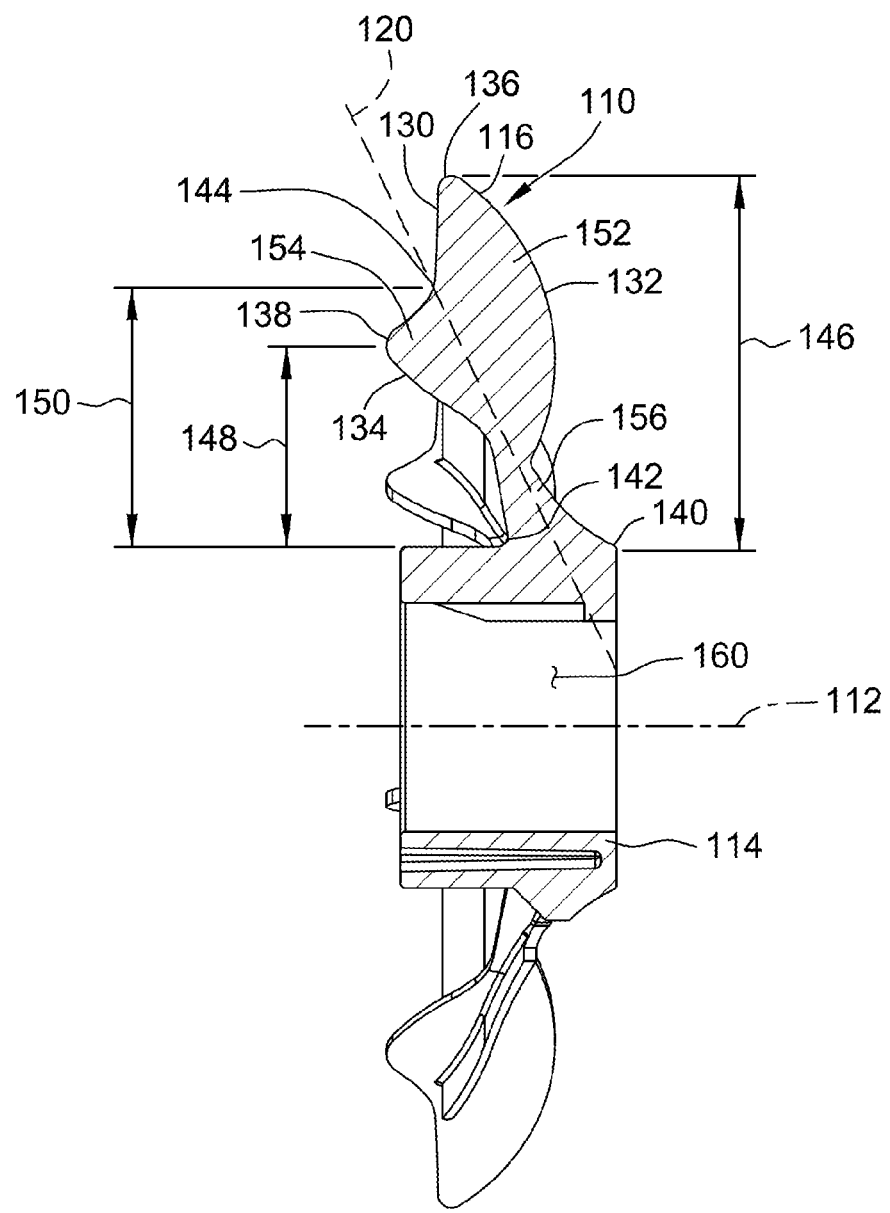
FIG. 7 is a cross-sectional view of the axial fan impeller of FIG. 3 taken along line 7-7.

In the exemplary embodiment, axial fan 12 includes an impeller 110. FIG. 3 is a schematic perspective of exemplary axial fan impeller 110. FIG. 4 is a front view of impeller 110. FIG. 5 is a side view of impeller 110. FIG. 6 is a rear view of impeller 110. FIG. 7 is a cross-section of impeller 110 taken along line 7-7. In operation, a fan motor (not shown) is configured to rotate impeller 110 about a rotation axis 112 to produce airflow.

Impeller 110 comprises a central hub 114 and a plurality of vertical blades 116 connected to hub 114. The term "vertical" is used herein to mean that air directing surfaces of blades 116 are substantially coplanar with rotation axis 112. In other embodiments, blades 116 are not vertical blades, i.e., air directing surfaces of blades 116 are not substantially coplanar with rotation axis 112. In the exemplary embodiment, impeller 110 has seven vertical blades 116. Alternatively, impeller 110 has any number of blades 116.

Surrounding hub 114, impeller 110 includes a guide 118 coupled to and bisecting blades 116 substantially at a blade longitudinal axis 120. Guide 118 has a substantially frustoconical shape (as best seen in FIG. 5) and has a circular perimeter (as best seen in FIG. 6). In alternative embodiments, guide 118 surrounds only a portion of hub 114, i.e., guide 118 comprises at least one section adjacent a portion of hub 114. In the exemplary embodiment, guide 118 defines an inlet side 122 of impeller 110, where air is drawn towards impeller 110, and an outlet side 124 of impeller 110, where air is expelled away from impeller 110. A first surface 126 of guide 118, which is the outer surface of the frustoconical shape as viewed in FIG. 5, defines inlet side 122. An opposed second surface 128 of guide 118 defines outlet side 124. First surface 126 and second surface 128 direct air drawn into and expelled from impeller 110.

In the exemplary embodiment, each blade 116 extends at least partially on inlet side 122 and outlet side 124 of impeller 110. In alternative embodiments, some of blades 116 do not extend on both sides of impeller 110. For example, in one embodiment, impeller 110 includes outlet blades (not shown) extending only on outlet side 124 and inlet blades (not shown) extending only on inlet side 122. In alternative embodiments, impeller 110 includes any number and combination of inlet blades, outlet blades, and blades 116 that allow impeller 110 to function as described herein.

In the exemplary embodiment, each blade 116 is at least partially defined by a distal edge 130, an inlet edge 132, and an outlet edge 134. Distal edge 130 extends between a distal inlet tip 136 and a distal outlet tip 138. Inlet edge 132 extends between a first hub connection point 140 and distal inlet tip 136. A portion of inlet edge 132 extends along first surface 126. Opposite inlet edge 132, outlet edge 134 extends between a second hub connection point 142 and distal outlet tip 138. In the exemplary embodiment, a middle point 144 is located on distal edge 130 between distal inlet tip 136 and distal outlet tip 138. A first radial distance 146 between distal inlet tip 136 and first hub connection point 140 is greater than a second radial distance 148 between distal outlet tip 138 and first hub connection point 140. Further, first radial distance 146 is greater than a third radial distance 150 between middle point 144 and first hub connection point 140. Thus distal edge 130 is at least partially angled. In the exemplary embodiment, distal edge 130 has two straight portions angled in relation to each other such that distal edge 130 substantially forms an obtuse angle, i.e., an angle greater than 90°, measured at middle point 144. In alternative embodiments, distal edge forms any number of angles having any measurement. Overall, the configuration of inlet edge 132, outlet edge 134, and distal edge 130 give blade 116 a general double-finned tail shape, similar to a shark tail.

Figure 8:
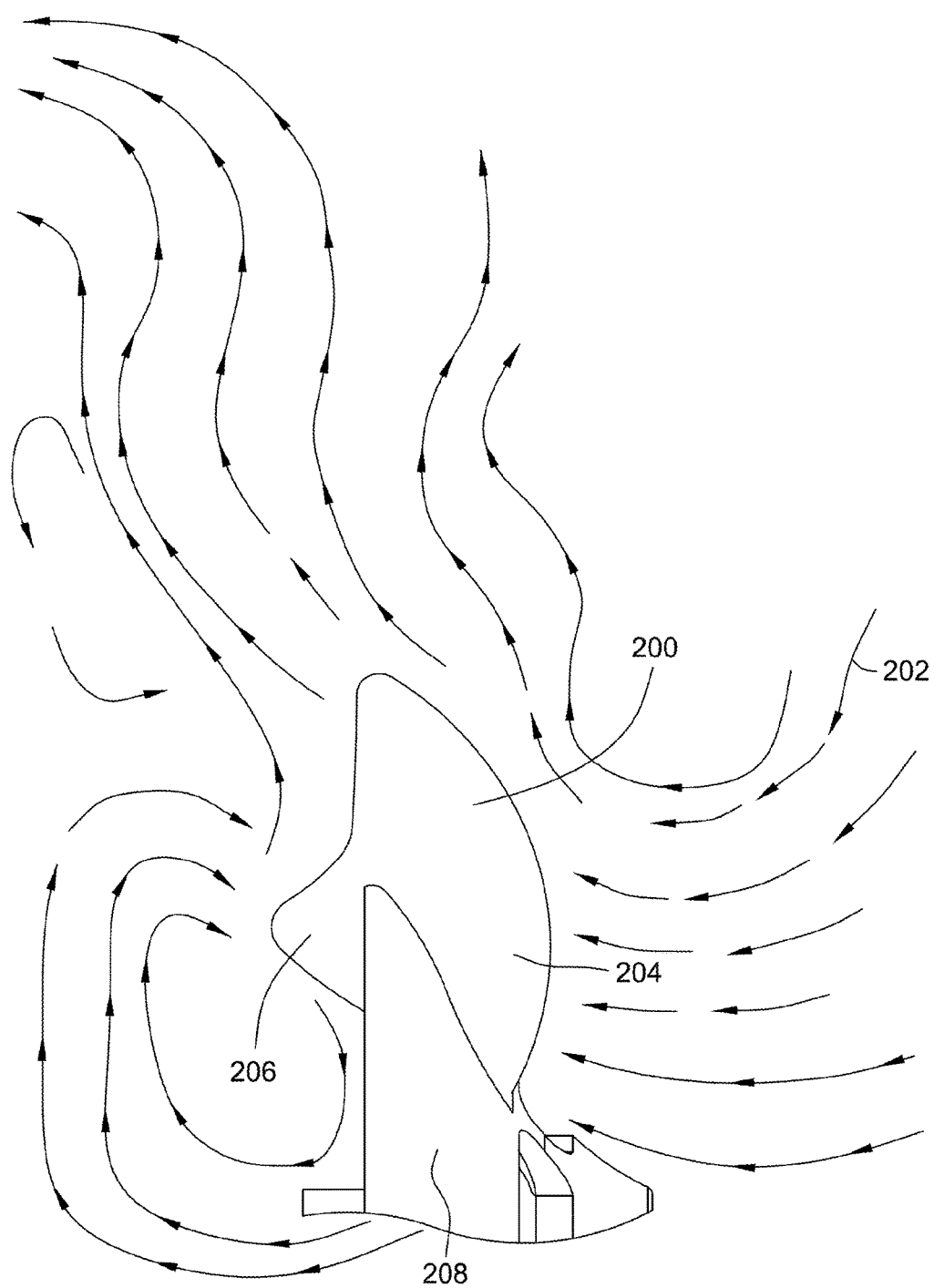
FIG. 8 is a side view of an exemplary blade showing airflow around the blade.

Contributing to this shark tail shape, inlet edge 132, outlet edge 134, and distal edge 130 all have curved shapes, as best seen in FIGS. 7 and 8. In other embodiments, blades 116 comprise any number of edges having any suitable curved or straight shapes. Additionally, in some embodiments, blades 116 have edges with combinations of curved and straight portions. In the exemplary embodiment, inlet edge 132 has a generally convex shape along substantially its entire length. Outlet edge 134 has a generally concave shape near hub 114 and a generally convex shape near distal outlet tip 138. Distal edge 130 has a generally concave shape in its middle and generally convex shapes near distal outlet tip 138 and distal inlet tip 136.

As can be seen in FIG. 7, blade longitudinal axis 120 passes through middle point 144 of distal edge 130 and between first hub connection point 140 and second hub connection point 142. Blade longitudinal axis 120, inlet edge 132, and a portion of distal edge 130 define an inlet portion 152 of blade 116. Opposed to inlet portion 152, an outlet portion 154 is defined by blade longitudinal axis 120, inlet edge 132, and a portion of distal edge 130. A stem portion 156 connects inlet portion 152 and outlet portion 154 to hub 114. Stem portion 156 has a reduced cross-sectional area to optimize manufacturing material and improve fan airflow.

In the exemplary embodiment, guide 118 defines openings 158 positioned around hub 114. Openings 158 are located near the center of guide 118 and, thus, close to hub 114. Openings 158 facilitate moving air from inlet side 122 to outlet side 124 of impeller 110, which reduces the generation of inefficient flow structures adjacent hub 114. In alternative embodiments, guide 118 defines any number of openings 158, such as one continuous opening, that allows impeller 110 to function as described herein. Alternatively, guide 118 is free of openings 158. In the exemplary embodiment, guide 118 defines seven openings 158 having the shape of arced slots with rounded edges. Therefore, the number of openings 158 equals the number of blades 116 on impeller 110. Openings 158 are spaced evenly between blades 116. In other embodiments, openings 158 have any shape and are spaced in any manner that allows them to function as described herein.

Advantageously, when impeller 110 is rotated, inlet portions 152 and outlet portions 154 function as two fans moving air on both sides of impeller 110. This double sided action reduces the axis force on impeller 110. Additionally, impeller 110 generates and directs high efficiency airflow when rotated. Impeller 110 reduces the generation of inefficient flow structures at locations where air is drawn towards impeller 110, where air is expelled from impeller 110, and between blades 116. Overall, impeller 110 provides a smooth low pressure flow on inlet side 122 and outlet side 124 to generate minimal noise when impeller 110 is rotated about axis 112 to move air.

In the exemplary embodiment blades 116 are integrally formed with hub 114. In other embodiments, blades 116 are coupled to hub 114 by mechanical fasteners, by welds, and/or in any other manner that allows impeller 110 to function as described herein. In the exemplary embodiment, hub 114 has a hollow center 160 configured to couple to rotor shaft 22 for rotating impeller 110 around rotation axis 112.

FIG. 8 is a side view of a single blade 200 showing airflow 202 around blade 200. Blade 200 is substantially similar to blade 116 of impeller 110. As airflow 202 flows past blade 200, an inlet portion 204 directs airflow 202. The shape of inlet portion 204 optimizes the surface area that directs airflow 202 and facilitates airflow 202 maintaining a substantially constant velocity. The constant velocity of airflow 202 minimizes the generation of high pressure areas and inefficient flow structures. Additionally, an outlet portion 206 directs airflow 202 under a guide 208 and, thus, minimizes the generation of high pressure areas and inefficient flow structures adjacent guide 208. This lower pressure airflow 202 is more efficient and generates less noise. Together, guide 208 and blade 200 facilitate a smooth airflow 202 past inlet portion 204 and outlet portion 206 to increase efficiency gains and further reduce noise generation of a fan (not shown) coupled to blade 200. Furthermore, the simultaneous direction of airflow 202 by outlet portion 206 and inlet portion 204 reduces the axis forces that act on blade 200 and a fan (not shown) coupled to blade 200.

Blade 200 is suitably fabricated from any number of materials, including, but not limited to, plastic, metal, and flexible or compliant materials. For example, blade 200 is formed by a molding, forming, extruding, and/or three-dimensional printing process used for fabricating parts from thermoplastic or thermosetting plastic materials and/or metals. Alternatively, blade 200 is fabricated from a combination of materials such as attaching a flexible or compliant material to a rigid material. In alternative embodiments, blade 200, however, is constructed of any suitable material, such as metal, that permits blade 200 to operate as described herein.

An exemplary method of cooling motor 10 uses axial fan 12. Motor 10 generally includes housing 16 and circular end brackets 34 and 36 that substantially enclose motor 10. Housing 16 includes a plurality of cooling fins 18 substantially covering and extending outward from housing 16. In addition, motor 10 includes rotor 20 coupled to rotor shaft 22 within housing 16. Rotor 20 is surrounded by a stator 24 coupled to housing 16. Impeller 110 of axial fan 12 is drivingly coupled to rotor shaft 22 for rotation about rotation axis 112. Impeller 110 comprises blades 116 and guide 118 coupled to blades 116. The exemplary method also includes providing cowl 14 configured to direct airflow 50 to cooling fins 18 along the outside of housing 16 of motor 10.

The exemplary method further includes forcing airflow 50 into chamber 46 of cowl 14 through inlet 52. In chamber 46, impeller 110 rotates to direct and move airflow 50. Specifically, airflow 50 is drawn into impeller 110 on inlet side 122. The method further includes directing airflow 50 through opening 158 in guide 118 towards outlet side 124 of impeller 110. Inlet portions 152 and outlet portions 154 of blades 116 contact airflow 50 such that inlet side 122 and outlet side 124 of impeller 110 direct airflow 50. In addition, the method includes expelling airflow 50 out of chamber 46 and along housing 16.

Exemplary embodiments of a fan are described above in detail. The fan and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

The apparatus, methods, and systems described herein provide an axial fan that is configured to bolt directly to an end bracket of a totally enclosed electric motor. Moreover, the benefits derived from the axial fan include increasing the efficiency and decreasing the noise of fans for cooling totally enclosed electric motors. The exemplary embodiments described herein provide apparatus, systems, and methods particularly well-suited for industrial electric motors.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An axial fan comprising:
a hub defining a center of said axial fan;
a guide surrounding said hub, said guide defining at least one opening that facilitates airflow on an outlet side of said axial fan; and
at least one blade coupled to said hub and extending radially outward from a first hub connection point and a second hub connection point of said hub, said at least one blade comprising a distal tip edge extending from a distal outlet tip to a distal inlet tip, said guide bisecting said at least one blade along a blade longitudinal axis, the blade longitudinal axis passing through said distal tip edge and between said first hub connection point and said second hub connection point, the blade longitudinal axis defining an inlet portion and an outlet portion of said at least one blade,
wherein said at least one blade further comprises an outlet edge extending from said second hub connection point to said distal outlet tip, said outlet edge having a generally curved shape, and wherein said at least one blade further comprises an inlet edge extending from said first hub connection point to said distal inlet tip, said inlet edge being generally convex, and wherein said outlet edge is concave near said hub and convex near said distal outlet tip.

2. The axial fan in accordance with claim 1 further comprising a cowl to direct air moved by said axial fan.

3. The axial fan in accordance with claim 1, wherein said distal inlet tip is spaced a first radial distance from said first hub connection point and said distal outlet tip is spaced a second radial distance from said first hub connection point, said first radial distance greater than said second radial distance.

4. The axial fan in accordance with claim 3, wherein said distal tip edge further comprises a middle point located on said distal tip edge between said distal inlet tip and said distal outlet tip, said middle point spaced a third radial distance from said first hub connection point, said first radial distance greater than said third radial distance and said third radial distance greater than said second radial distance, wherein the blade longitudinal axis extends through said middle point.

5. A fan comprising:
a hub defining a center of the fan;
a blade coupled to said hub, said blade extending radially outward from said hub and having a longitudinal axis, said blade comprising:
an inlet distal tip spaced a first radial distance from a first hub connection point,
an outlet distal tip spaced a second radial distance from said first hub connection point,
a distal edge extending between said inlet distal tip and said outlet distal tip;
an inlet edge extending between said inlet distal tip and said first hub connection point, wherein said inlet edge is generally convex; and
an outlet edge extending between said outlet distal tip and a second hub connection point, wherein an inlet portion of said blade is defined by the longitudinal axis, said inlet edge, and a first portion of said distal edge, and wherein an outlet portion of said blade is defined by the longitudinal axis, said outlet edge, and a second portion of said distal edge, wherein said outlet edge is concave near said hub and convex near said distal outlet tip.

6. The fan in accordance with claim 5 further comprising a plurality of blades coupled to and evenly spaced around said hub to form an impeller.

7. The fan in accordance with claim 6, wherein each blade is substantially coplanar with a rotation axis of said impeller.

8. The fan in accordance with claim 5, wherein said blade is a first blade, the fan further comprising a second blade coupled to said hub and a guide surrounding said hub and bisecting said first blade and said second blade, said guide defining an opening between said first blade and said second blade.

9. The fan in accordance with claim 5 further comprising a guide surrounding said hub and bisecting said blade along the longitudinal axis.

10. The fan in accordance with claim 9, wherein said guide defines at least one opening configured to facilitate airflow to said outlet portion of said blade.

11. The fan in accordance with claim 9, wherein said guide defines a plurality of openings evenly spaced around said hub.

12. The fan in accordance with claim 5, wherein said distal edge is concave near a middle point of said distal edge and convex near both said distal outlet tip and said distal inlet tip.

13. A method of cooling an enclosed motor using a fan coupled to the motor, the method comprising:
providing the fan comprising an impeller with a plurality of blades and a guide coupled to the plurality of blades, a first blade of the plurality of blades having an inlet portion and a second blade of the plurality of blades having an outlet portion, wherein each of the plurality of blades includes a distal tip edge extending from a distal outlet tip to a distal inlet tip, and wherein each of the plurality of blades has a longitudinal axis passing between a first connection point and a second connection point;
rotating the impeller to draw air into the fan on an inlet side such that air contacts the inlet portion of the first blade; and
directing air through an opening in the guide towards an outlet side of the fan such that air contacts the outlet portion of the second blade, wherein each of the plurality of blades includes an outlet edge extending from the second connection point to the distal outlet tip, wherein the outlet edge is concave near said second connection point and convex near said distal outlet tip.

14. The method in accordance with claim 13, wherein providing the fan comprises providing the fan, each of the plurality of blades further comprising an inlet edge extending from the first connection point to the distal inlet tip, said inlet edge having a generally curved shape.

15. The method in accordance with claim 13, wherein directing air through an opening in the guide comprises directing air through a plurality of openings in the guide towards an outlet side.

16. The method in accordance with claim 13, wherein providing the fan comprises providing the fan, the fan comprising the impeller with the plurality of blades, at least one blade of the plurality of blades having both the inlet portion and the outlet portion.

* * * * *